July 11, 1961

H. C. GLESMANN ET AL 2,991,863

HAND OPERATED CONTROL MECHANISM FOR
A PLURALITY OF CLUTCH ASSEMBLIES

Filed June 19, 1959

Inventors:
Herbert C. Glesmann
Robert D. Barrett
Olin M. Dyrby
Paul O. Pippel Atty.

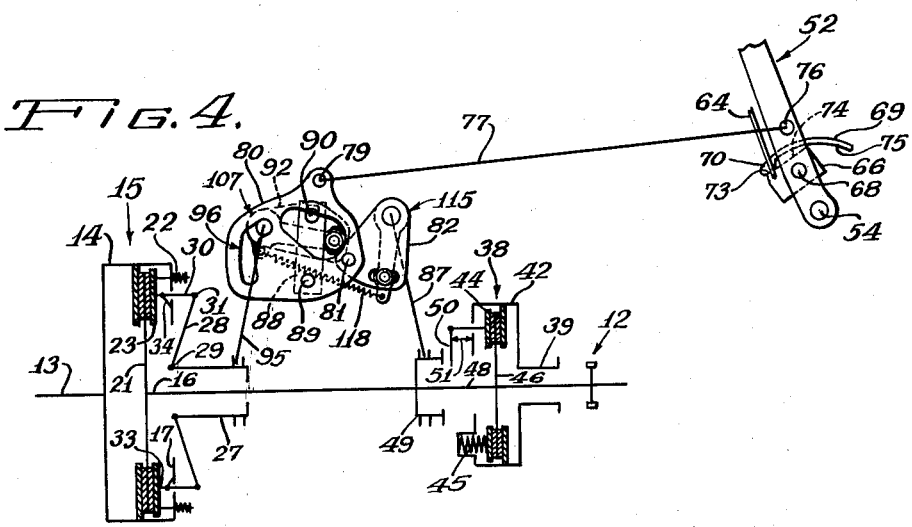
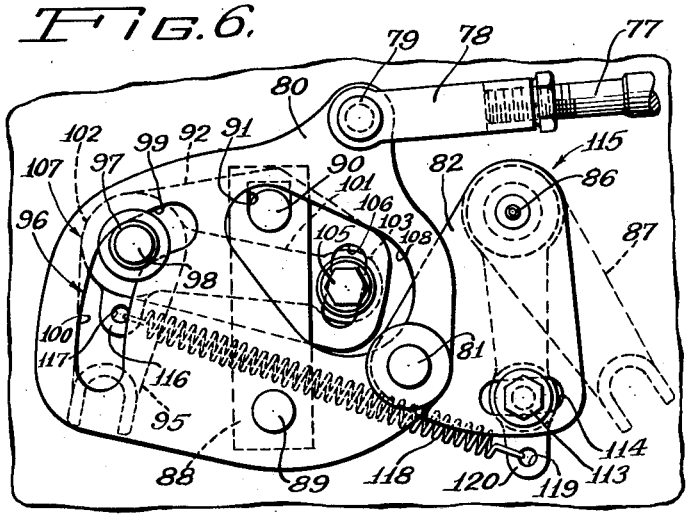
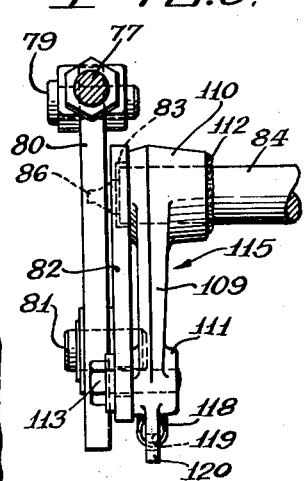

July 11, 1961 H. C. GLESMANN ET AL 2,991,863
HAND OPERATED CONTROL MECHANISM FOR
A PLURALITY OF CLUTCH ASSEMBLIES
Filed June 19, 1959 4 Sheets-Sheet 4
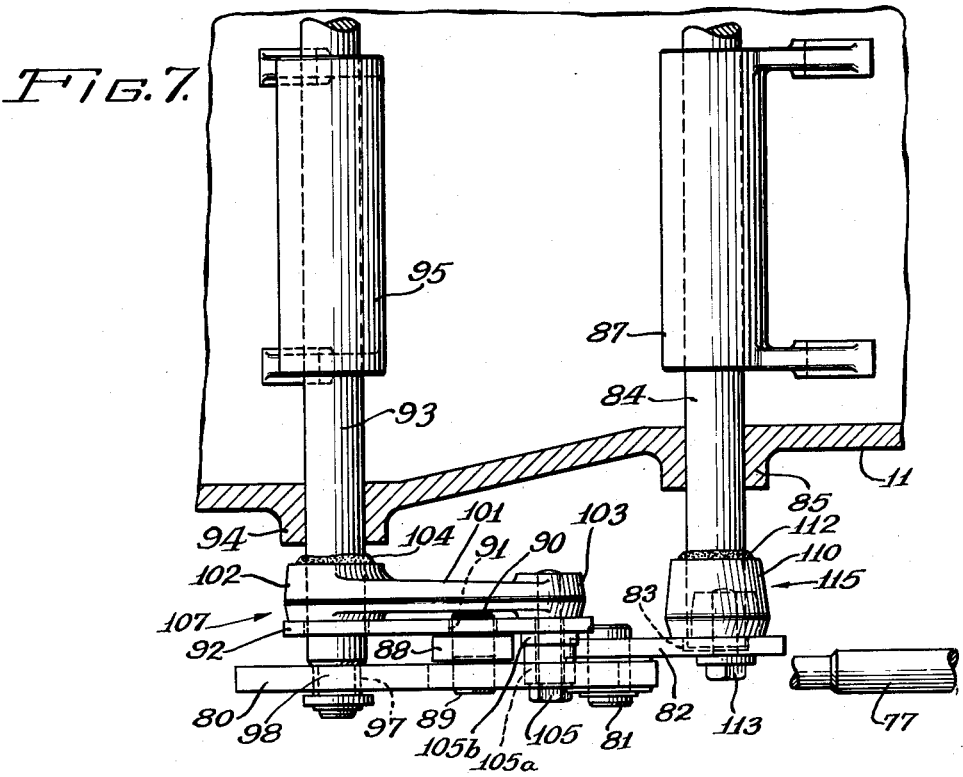
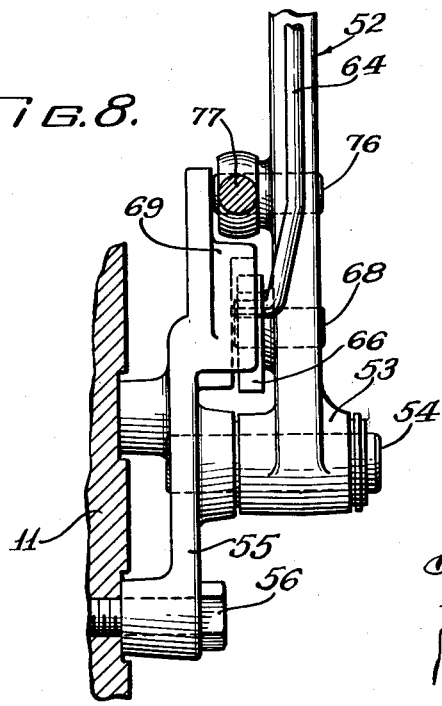
Inventors:
Herbert C. Glesmann
Robert D. Barrett
Olin M. Dyrby
Atty.

United States Patent Office 2,991,863
Patented July 11, 1961

2,991,863
HAND OPERATED CONTROL MECHANISM FOR A PLURALITY OF CLUTCH ASSEMBLIES

Herbert C. Glesmann, Naperville, Robert D. Barrett, Westchester, and Olin M. Dyrby, Lemont, Ill., assignors to International Harvester Company, Chicago, Ill., a corporation of New Jersey
Filed June 19, 1959, Ser. No. 821,575
6 Claims. (Cl. 192—48)

This invention relates generally to drive transmitting apparatus in vehicles, but is more particularly directed to the control mechanisms provided for controlling actuation of the clutch assemblies forming a part of such apparatus.

The present invention is more particularly concerned with the control mechanisms provided for actuating clutches in vehicles, such as tractors, where plural clutching assemblies are frequently employed for individually controlling the transmission of drive alternatively through a variety of gear trains from the engine or power plant to the propelling wheels or ground engaging means of a vehicle. In assemblies of this character it is frequently desired to provide means for actuating the clutches therein by a hand operated lever so as to permit the operator's feet to be freed for use for other purposes, such as operating the vehicle while standing, or for operating other foot operated control devices, and it is to a mechanism of such character that the present invention is more specifically directed. A tractor vehicle of the type that utilizes a plurality of clutching mechanisms so as to provide drive direct to a change-speed transmission or alternatively through an auxiliary gear train to modify the torque and speed of such drive, and to which features of the present invention are peculiarly adaptable, is illustrated and described in the U.S. Patent No. 2,654,255, issued October 6, 1953 to Henry A. Ferguson et al. and assigned to the same assignee as the proposed invention. Although the present invention envisages the use of one over-center type and one spring-loaded type clutch whereas the Ferguson et al. structure utilizes two spring-loaded type clutches, it will be recognized that features of the proposed control mechanism are very readily adaptable for use with such assemblies. It should be appreciated, however, it is not intended that the presently proposed invention be limited to the specific application or embodiment found in that patent since it is believed to be susceptible of adaptation to other drive transmitting mechanisms.

The principal object of the present invention is to provide an improved and simplified manually operable control means for sequentially actuating a plurality of clutching mechanisms in a drive transmitting apparatus.

Another important object is to provide clutch actuating means, manually activated by a hand operated lever, that is operative in one position of such means for effecting the engagement of a first clutch while retaining a second clutch, operatively interconnected with the first clutch, in a disengaged condition, and in another position of the means for disengaging said second clutch without modifying the previously established engaged condition of said first clutch.

A further important object is to provide a clutching assembly control mechanism that is manually operative for sequentially actuating a first clutch of the over-center type and then a second clutch of the spring-loaded type, and subsequently further retaining certain established positions for said clutches after the manual force for motivating such control mechanism has been removed therefrom.

A more specific object is to provide, in a vehicle having two coaxially disposed clutches, arranged in a back-to-back relation and operatively interconnected in such manner that when both clutches are engaged drive is transmitted from the first through the second of said clutches and when the first one thereof is engaged with the second one disengaged drive from the first is bypassed around the latter, a clutch actuating mechanism wherein a manually operable handle member is connected by push-rod means to an assembly that includes a cam-plate and a plurality of devices constituting bell-cranks connected to the cam-plate and wherein said cam-plate is operatively connected by separate bell-cranks to the respective throwout bearing units of the clutches, and which mechanism is operative upon application of force to said handle member for initially actuating one of said clutches and subsequently the second one thereof, and then retaining said clutches thus conditioned until subsequently altered by manual operation of the handle member.

Another specific object is to provide, in a vehicle having an over-center type main clutch coaxially arranged and disposed in a back-to-back relation with respect to a spring-loaded type secondary clutch axially spaced therefrom and operatively interconnected therewith, a clutch actuating mechanism manually operative upon movement of a hand lever to a first position wherein both of said clutches are disengaged and drive therethrough is interrupted, and to a second position in which only the over-center main clutch is engaged and conditioned for transmitting drive therethrough, and to a third position in which both clutches are engaged and conditioned for transmitting drive therethrough, and wherein said clutches may be retained in their engaged conditions without the application of external manual force.

A still further object is to provide a clutching assembly actuating means, operative for sequentially actuating operatively interconnected over-center and spring-loaded clutching devices, and which includes separate bell-crank devices operatively connected to throwout bearing units of the respective clutches, and means interconnecting said separate bell-crank devices including a cam track fashioned in a portion of said interconnecting means and which cooperatively receives a roller follower, the rotatable axis of which is fixed with respect to the transverse axes about which said bell-crank devices rotate, and which operates to guide the movements of said interconnecting means, and a manually operable handle mechanism for applying motion to said interconnecting means.

The foregoing and other objects and features of the invention will become apparent as the disclosure is more fully made in the following detailed description of a preferred embodiment of the invention as illustrated in the accompanying sheets of drawings in which:

FIG. 4 is a view generally similar to FIGS. 2 and 3 but showing the relative positions of the various elements when the control mechanism has been actuated for effecting engagement of both clutches in the assembly;

FIG. 5 is a fragmentary vertical sectional view, in enlarged detail, taken along the line 5—5 of FIG. 1;

FIG. 6 is a vertical elevational view, in enlarged detail, of the cam plate and bell-crank elements of the control mechanism;

FIG. 7 is a fragmentary horizontal sectional view, in enlarged detail, taken along the line 7—7 of FIG. 1, but shown with the clutch throwout mechanism omitted therefrom; and FIG. 8 is a fragmentary vertical sectional view, in enlarged detail, taken along the line 8—8 of FIG. 1.

Figure 1:
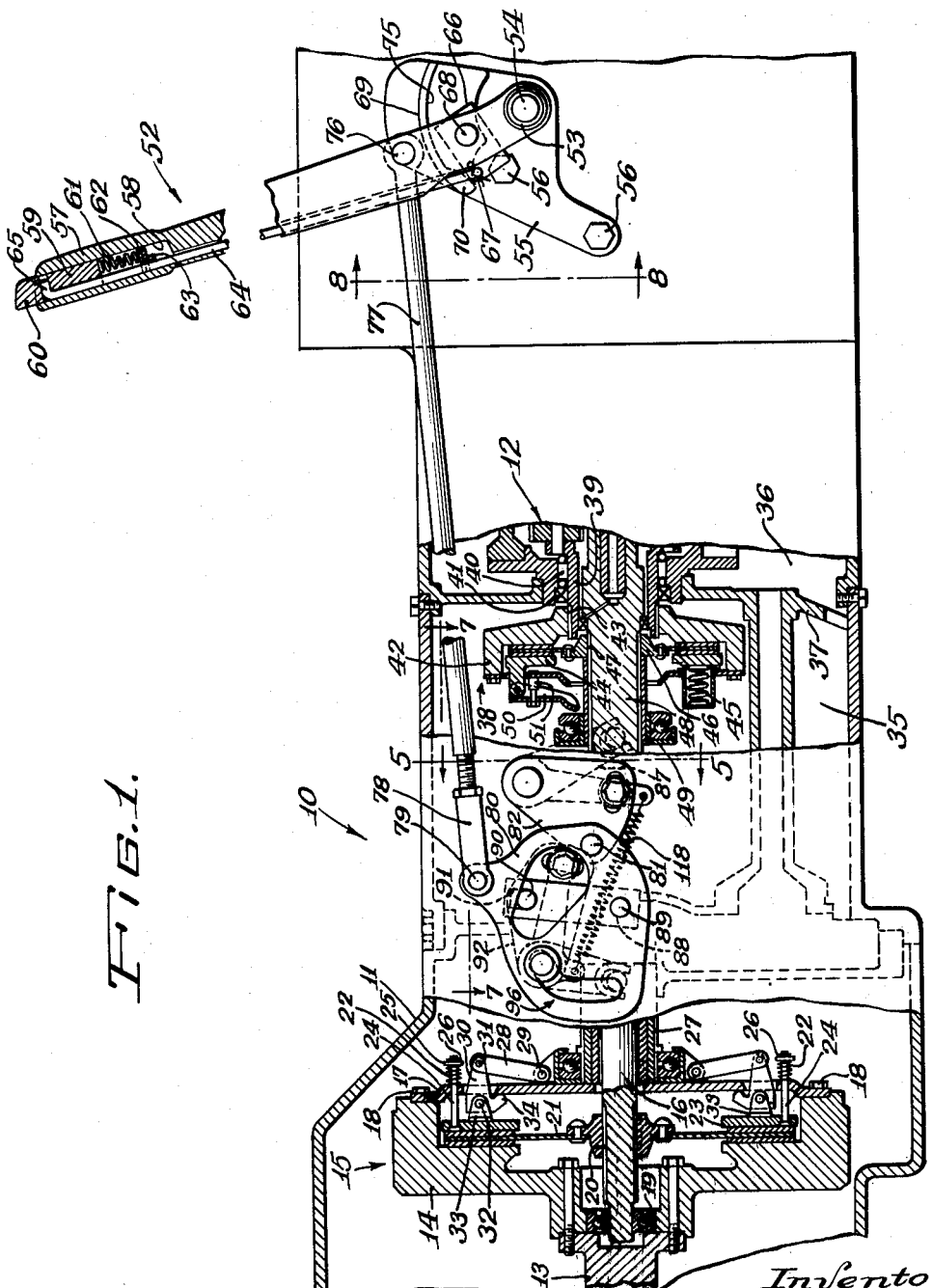
FIG. 1 is a longitudinal side elevational and sectional view of the clutch housing portion of a tractor vehicle into which the proposed clutching control mechanism has been incorporated, and shown with the clutches on their engaged positions.

In order to obtain a better understanding of the application of the present invention, one preferred embodiment thereof is illustrated in the above noted drawings which show a generally conventional transmission drive mechanism wherein the invention has been incorporated. The heretofore noted U.S. Patent No. 2,654,255 to Henry A. Ferguson et al., shows a drive mechanism that is particularly adaptable for utilization therein of the proposed invention, and hence the drawings hereof endeavor to illustrate the controls and the specific type clutches of the invention as they might be applied in one application to a modified form of said patented structure.

Referring now specifically to the drawings, it will be noted that a plural clutching assembly, indicated generally by the reference character 10, is shown encased within a housing or casing such as 11 that is disposed in axial alignment with a torque amplifying gearing unit, fragmentarily indicated at 12, and a generally conventional change-speed transmission structure (not shown), both of the latter of which may be identical with the corresponding components shown in the above noted Ferguson et al. patent. The change-speed transmission unit is, of course, adapted for driving connection on the output side thereof, by way of a final drive assembly (not shown), with the propelling wheels or ground engaging means of a vehicle, such as a tractor, while the clutching assembly on the input side is intended for driving connection with the power plant or engine of the vehicle wherein the present invention is employed, all of which is well understood, but since the inclusion of all these associated components in the drawings was felt to be unnecessary to a comprehensive understanding of the invention they have been omitted therefrom.

A crank shaft 13, which may be a continuation or extension of the crank shaft of a suitable vehicle engine (not shown), has on the rear end thereof a flywheel or clutch driving member 14 that is operative through a conventional over-center friction clutch, indicated generally at 15, for driving a drive shaft 16 of the vehicle's power transmitting and dividing apparatus at engine speed. A back-up or cover plate member 17 of said clutch is rigidly secured at its perimeter by cap screws 18 to the rear side of said flywheel or driving member. The drive shaft 16 is journalled at the forward end thereof, by an antifriction bearing unit such as 19 mounted in the flywheel 14, and has a splined connection at 20 with a driven disk member 21 of the clutch 15. A plurality of coil springs 22 spaced circumferentially of the back-up plate 17, only two of which are shown in the drawings, normally aid in biasing or holding said clutch in a disengaged position by urging an annular pressure plate 23 away from the rear face of the clutch driven disk member 21 which latter member otherwise is frictionally held between such pressure plate and the rear face of the flywheel or driving member 14.

Each of the springs 22 encircles the shank of a headed rod 24 positioned through the pressure plate 23 and having a collar or stop washer member 25, suitably held against displacement by a pin 26 on the outer end of said rod, while the washer provides an abutment for the outer end of the spring and thus permits the springs to cooperate with the rods to transmit the reactive effect of the springs to said pressure plate so as to normally urge the plate away from the friction disk member. Release and engagement of the clutch disk 21 for operatively disengaging and engaging the drive shaft 16 from and to its driving connection with the engine of the vehicle is accomplished in a generally conventional fashion involving the application of a manual force against a reciprocally mounted throwout bearing unit such as 27. This throwout unit, upon axial movement resulting from a manually applied force, forces clutch levers such as shown at 28 and pivotally attached at 29 to move associated fulcrum members 30, pivotally attached at 31 to the opposite end of said levers and at 32 to stud brackets or mounting posts 33, in turn, affixed to the pressure plate 23, and to rock or rotate these fulcrum members about the pivots 32 thereby axially displacing said pressure plate and attendant therewith causing either engagement or disengagement of the clutch depending upon the direction of the reciprocating movement of said throwout unit. The fulcruming members 30 may be fashioned with an offset arm-like projection 34 which, upon counterclockwise rotation of said members (as viewed in FIG. 1), engages the inner face of the back-up plate 17 in fulcruming fashion and thus forces the fulcruming members 30 and the attached clutch pressure plate 23 forwardly to effect engagement of the clutch. As the throwout unit 27 is moved axially forwardly (to the left as ultimately shown in FIG. 1) the pivotal connection at 29 of said unit with the clutch lever 28 gradually approaches a vertical alignment with the pivotal connection at 31 of said lever with the fulcrum member 30 and then when the clutch is completely engaged these pivot points will be in vertical alignment. Now any further axial movement of the throwout unit in the same direction will cause the connection at 29 to move beyond the alignment axis with pivot 31 and thereby provide an over-centering action which functions to maintain the clutch locked-up or engaged until released by a rearward axial movement of the throwout unit 27.

The casing or housing 11, which may be suitably supported or carried on the vehicle as is well understood, accommodates the plural clutching assembly 10, together with appropriate associated components as will presently be apparent, and includes a forward compartment 35 that is separated from a rearward compartment 36 by a transverse wall or bulkhead member 37. A generally conventional friction clutch of the spring-loaded type, indicated generally at 38 and disposed at the rearward portion of said forward compartment, is in control of the torque amplying unit that is disposed primarily in said rear compartment but which may extend into said forward compartment and is shown only fragmentarily at 12. This torque amplifying unit, however, may be similar to the corresponding unit and its arrangement specifically described and detailed in the Ferguson et al. Patent 2,654,-255 heretofore noted.

A tubular extension, shown only in part at 39, forming a portion of the mechanism of the torque amplifying unit indicated at 12, constitutes a control element for said latter unit and is journalled within a portion of the bulkhead wall 37 upon an anti-friction bearing unit 40, while an annular seal 41 may be provided to prevent leakage of lubricant between said forward and rear compartments. A drum-like body or bell portion 42 of clutch 38 is splined to the tubular control element 39 at 43 and has constrained for rotation therewith a pressure plate 44 which is urged by springs, one of which is shown at 45, to press a disk 46 of said clutch between the pressure plate 44 and the driven clutch body member 42 thereof, while said latter disk, in turn, is splined at 47 to an extension 48 of the drive shaft 16. This secondary clutch 38 is normally held engaged by the springs 45 but can be released at will by rearward axial movement of a clutch throwout bearing unit 49 and consequent pivoting of the clutch levers or fingers 50 upon fulcrum members 51 for pulling the pressure plate 44 forwardly from the drum-like body portion 42. When the latter clutch is engaged, the drive shaft extension 48 and the tubular control element 39 of the torque amplifying unit 12 will be constrained for unitary rotation, and when this clutch is disengaged, said drive shaft extension can rotate relatively to said tubular control element. While the structure of the secondary or auxiliary clutch 38 is somewhat conventional, the operation thereof in the prescribed arrangement is not commonplace because the disk element 46 is constituted as the driving member and, as such, transmits drive from the drive shaft extension member 48 to the drum-like body portion 42 which, in this instance, functions as a driven member, and then, in turn, transmits the drive to the tubular control element 39 of said torque amplifying unit.

In normal operation, or what is frequently called direct drive of the vehicle, the two clutches 15 and 38, will be conditioned for engagement and a power transmitting connection will have been established from the engine shaft 13 to the tubular control element 39 and thence, through certain components of the torque amplifying unit 12, and the change-speed and final drive assemblies (not shown) of the vehicle, to the propelling wheels or ground engaging means thereof. However, when the secondary clutch 38 is released or disengaged, drive is then transmitted from the drive shaft extension 48, through additional components of the torque amplifying unit 12, thence the change-speed transmission and final drive assemblies, to the propelling wheels or ground engaging means at a reduced speed and amplified torque as more particularly explained in the previously mentioned Ferguson et al. Patent 2,654,255. When the main clutch 15 is released or disengaged, drive from the crankshaft 13 through said main clutch to the drive shaft 16 is discontinued thereby interrupting drive to the wheels or ground engaging means of the vehicle.

Now, in accordance with the more specific teachings of the instant invention, there is provided a clutch assembly actuating or operating mechanism which is primarily operable for sequentially actuating said secondary and main clutches and, secondarily for retaining or holding, if desired, said secondary clutch disengaged after the motivating force that effected the operation of the mechanism and disengagement of that clutch has been removed therefrom, it being appreciated, of course, that the overcentering mechanism of the main clutch, which is operative responsive to the operation of the proposed actuating mechanism, may be utilized to simultaneously retain said latter clutch also fixedly conditioned but in an engaged position.

A handle or hand operated member, indicated generally by the reference character 52 and having an enlarged hub portion 53 at one end thereof, is adapted for pivotal mounting on a stud or dowel pin 54 carried by a bracket member 55, in turn, fixedly mounted, by suitable securing means such as the cap screws 56, on the housing 11. The opposite or hand grasping end 57 of the handle 52 is fashioned with a hollow center portion 58 that receives a plunger member 59 which has a button-like thumb-press extension 60 on the upper end thereof that may be pressed for releasing purposes as will soon be apparent. The inner end of said plunger abuts a trapped return spring 61 whose opposite end abuts a plate 62 transversely positioned in the hollow portion 58 and resting on oppositely positioned ledge-like angle members 63, in turn, fixedly secured to the walls of said hollow portion. A release rod 64 extending into said hollow handle portion has the upper end thereof bent over, as shown at 65, and positioned in a suitable opening in the plunger 59 and thus will slide vertically with movements of said plunger. The opposite or lower end of said release rod is bent over or turned outwardly and pivotally mounted in one end of a pawl-like latching member 66 and may, if desired, be conditioned against accidental removal therefrom by any suitable means such, for instance, as the cotter pin 67 illustrated. Said pawl, in turn, is pivotally mounted by a stud pin or dowel 68 on the handle 52 and rotates therewith. A raised arcuately-shaped ridge or ledge 69 on the bracket 55 has a downwardly extending portion 70 at one end thereof that provides a vertical ratchet surface 71 that abuttingly engages an inclined end portion 72 of pawl lever 66 in one position thereof (see FIG. 3) and a horizontally inclined ratchet surface 73 that abuttingly engages a side or top edge portion 74 of the pawl member in another of its positions (see FIG. 4), while in still another position (FIG. 2) said pawl may abut the arcuately-shaped surface 75 of the raised rim.

Pivotally mounted on the handle 52 in the vicinity of the pawl 66, by suitable means such as the stud pin or dowel 76, is one end of a push-rod 77, while the opposite end of said push-rod is threadably secured to a bifurcated or clevis portion 78 that is pivotably mounted by a headed pin 79 on an irregularly-shaped floating cam-plate 80. Said cam-plate is pivotally mounted on a stud or dowel pin 81 affixed to a plate-like crank 82 which, in turn, is rotatably piloted, by means of a recessed opening 83 in said plate, on the end portion of a transversely extending rockshaft 84 journalled in bearings, such as shown at 85, that are disposed in the opposite side walls of the housing 11 (but only one of each of which is shown). A conventional lubricating fitting may be provided, as indicated at 86, to facilitate lubricating said crank and rock-shaft. Intermediate the ends of the rock shaft 84, and fixedly mounted in any well-known manner for rotation therewith, is a shifter-fork or operating lever 87 which engages the reciprocally mounted throwout bearing mechanism 49, of the secondary clutch 38, so that upon rotation of said operating lever the adjoining throwout bearing unit is forced into engagement with the respective operating fingers 50 of the associated clutch to effect the disengagement of the clutch, as is well understood in the art.

A floating link member 88 has one end thereof pivotally mounted on a stud or dowel pin 89 affixed to cam-plate 80 while the opposite end of this link is provided with a stud or dowel pin 90 that is slidably and rotatably received in a slotted opening 91 which provides a lost-motion interconnecting means in a crank arm 92 which arm, in turn, is pilot mounted on a transversely extending rock shaft 93 journalled in bearings, such as 94, that are disposed in the opposite side walls of the housing 11 (only one of each of which is shown). Intermediate the ends of the rock shaft 93, and fixedly mounted in any well-known manner for rotation therewith, is a shifter-fork or operating lever 95 which engages the reciprocally mounted throwout bearing unit 27 of the main clutch 15 in conventional fashion so that upon rotation of said operating lever the adjoining throwout unit is caused to move axially and force the pivotally attached clutch levers 28 to rotate or rock the fulcrum members 30 about their respective pivots at 32, and thereafter axially displacing the clutch pressure plate 23, as previously noted, to cause engagement or disengagement of the clutch depending upon the direction of the axial movement of the associated throwout unit.

A generally L-shaped or deg-leg slotted opening 96 in the cam-plate 80 is fashioned with a lower branch and an upper branch and is dimensioned to rotatably accommodate therewithin a roller 97 that is piloted on a reduced-section end portion 98 of the transverse rock shaft 93 and positioned to extend into said opening. The slotted opening 96, in effect, provides an upper cam track or surface 99 and a lower cam track or surface 100 which react against the roller 97 and thus establishes a path, as will be hereafter explained, fo rguiding or controlling the movements of the floating cam-plate 80 as force, tending to rotate said cam plate, is manually applied thereto by way of push-rod 77.

An adjustably interlocking pick-up or motion-transmitting lever, indicated in its entirety by the numeral 101, has an enlarged hub 102 formed at one end and a smaller hub 103 at the other end thereof, and the enlarged hub is mounted on the transverse rock shaft 93 and constrained for rotation therewith by any suitable means such as the welds indicated at 104. The smaller hub 103 at the opposite end of said pick-up or connecting lever has a threaded opening therethrough that receives a cap screw 105, the shank of which also passes through a slotted opening 106 in the crank arm 92 while the head of the cap screw abuts a sleeve-like spaced 105a which engages a washer 105b that presses against the outer face of said crank arm. By tightening said cap screw the inner side or face of the crank arm 92 is brought into close frictional engagement with the adjusting or connecting lever 101 so that these two members are connected and may then rotate as a unit. As thus constituted the crank arm 92 together with the adjustably interconnecting lever 101, a portion of the transverse rock shaft 93 and attached shifter-fork 95 function generally as a bell-crank, which is represented generally by the reference character 107, for axially moving the respective throwout bearing unit. It will be appreciated, therefore, that rotational movement of the crank arm 92 acting through other elements of the bell-crank 107 thus formed will cause rotation of the shaft 93 with resultant actuation of the adjoining main clutch 15. An irregularly shaped opening 108 in the cam-plate 80 facilitates ready access to the cap-screw 105 to permit adjustment of lever 101, and, also, provides a space in which said cap-screw can maneuver as the bell-crank device 107 rotates relative to the cam-plate 80 as will be seen in FIGS. 2–4.

Another adjustably interlocking pick-up or motion-transmitting lever, indicated in its entirety by the numeral 109, has an enlarged hub 110 on one end and a smaller hub-like portion 111 proximate the opposite end thereof, and the enlarged hub portion is mounted on the transverse rock shaft 84 and constrained for rotation therewith by any suitable means such as the welds indicated at 112. The smaller hub portion 111 of this pick-up or connecting lever has a threaded opening therethrough that receives a cap screw 113, the shank of which also passes through a slotted opening 114 in the crank plate 82 while the head of the cap screw abuts the outer face of said crank plate. Tightening said latter cap screw pulls the inner side or face of the crank plate 82 into tight frictional engagement with the adjusting or connecting lever 109 so that these two members are connected and may then rotate as a unit. As thus constituted, the crank plate 82 together with the adjustably interconnecting lever 109, a portion of the transverse rock shaft 84 and attached shifter-fork 87 function generally as a bell-crank, that is represented generally by the reference character 115, for axially moving the respective throwout bearing unit. It will be evident that when the cap screw 113 holds these two members in tight frictional engagement that rotational movement of the crank plate 82 may be transmitted by way of other elements of the bell-crank 115 thus formed to the adjoining throwout bearing unit so as to effect the actuation of the secondary clutch 38.

Upon loosening the connecting cap screws 105 and 113 the adjusting levers 101 and 109 may be rotatively moved on argularly displaced relative to their respective cam-plate or crank-plate members, and such movement may be utilized to provide an adjustably interlocking or connecting means adaptable for compensating for such factors as wear, free travel, clearance or the manufacturing inaccuracies occasionally associated with mechanisms of the respective clutches.

Figure 2:
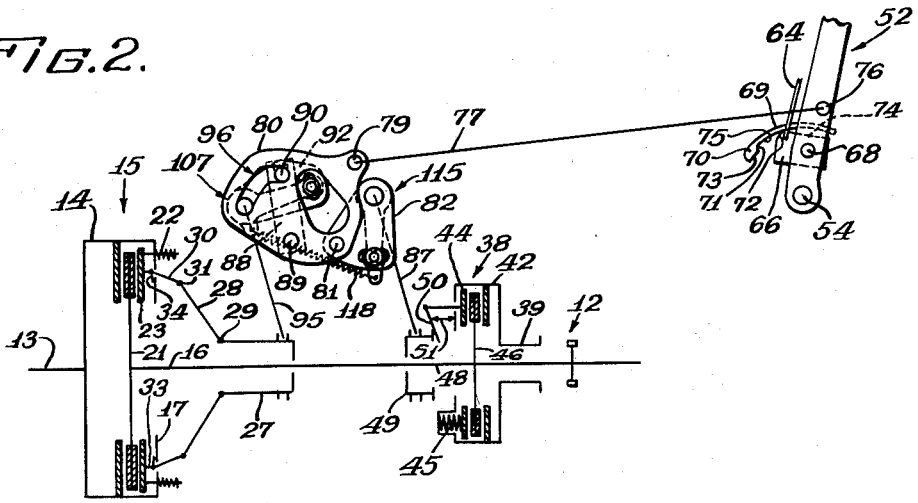
FIG. 2 is a diagrammatic representation including elements of the clutching assembly of FIG. 1 together with the proposed control mechanism, and showing the relative positions of the various control and clutch components involved when both clutches are conditioned for disengagement.
Figure 3:
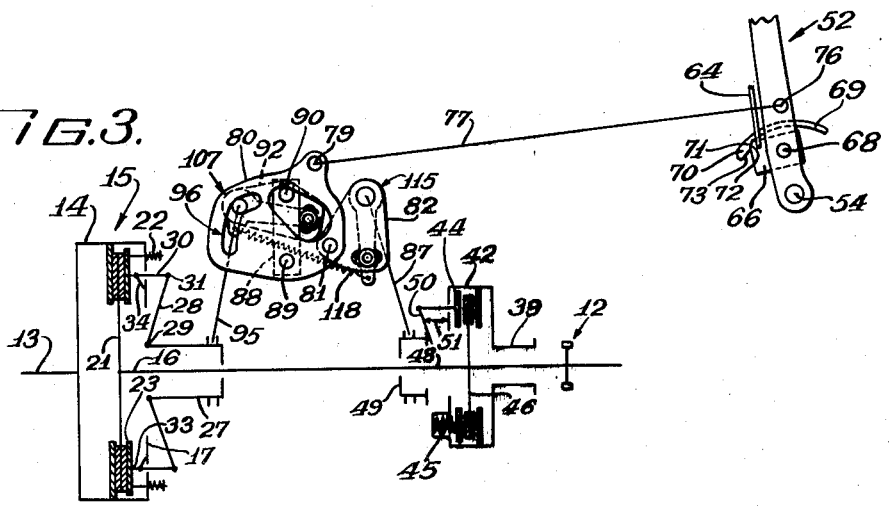
FIG. 3 is a view generally similar to FIG. 2 but showing the relative positions of the various elements when the control mechanism has been actuated for effecting engagement of only the main clutch in the assembly.

A depending ear or lug-like extension 116 on the adjusting lever 101 has an opening 117 therein that receives or anchors a hooked-over end of a coil spring 118 whose opposite end is similarly anchored in an opening 119 provided in a depending lug or ear-like extension 120 of the adjusting lever 109. Said spring functions, as will be seen in FIG. 4, as a return spring for the throwout bearing unit 49 of clutch 38, and as an over-center return spring for the throwout bearing 27 of clutch 15 as illustrated in FIG. 2.

By referring particularly to FIG. 6 it will be seen that the cam track or surface 100 of the lower branch of the slotted opening 96 in cam-plate 80 is generally vertical and arcuately-shaped with the center of said curvature coinciding with the transverse axis of the pivot pin 81, while the cam-track 99 in the upper branch of said opening is generally horizontal and is relatively flat. With this arrangement, while the cam-plate 80 is rotating counterclockwise about the pivot 81 said plate is being guided through the lower branch of the cam track 100 and during such movement the distance between the pivot 81 and the transverse rock shaft 93 remains fixed and hence there will be no tendency to actuate the secondary clutch 38. However, when the roller 97 enters and operates in the cam-track 99 of the upper branch the distance between the rock-shaft 93 and pivot 81 is decreased because of the generally horizontal inclination of the upper track toward said pivot whereupon the pivot 81 will be urged to rotate about the axis of the rock shaft 84 and when doing so will effect an actuation of the clutch 38. Attendant this movement the lower end of the floating link 88 is carried with the cam-plate 80 while the upper end of said link rotates about the pivot at 90 in the crank arm 92 and thus does not tend to cause any rotative movement of the bell-crank 107 thereby permitting the clutch 15 to remain engaged.

As the bell-crank 107 is rotated clockwise, one end of the spring 118 is moved away from the opposite end thereof thereby causing a reaction that tends to urge rotation of the cam-plate 80 clockwise against the manual force being applied through the push-rod 77.

The slotted opening 91, in the crank arm 92, is fashioned to provide a lost-motion connection between the interconnecting floating link member 88 and the crank arm 92 which functions to provide a dwell or lag period during some operations thereof, such as, between the time the disengagement of the secondary clutch 38 is completed and the disengaging operation of the main clutch 15 is started. In this way there is provided a means for manifesting to the operator, by way of feel of the reaction on the handle member 52, the exact location of the components of the mechanism thereby, in effect, indexing the start and stop positions thereof for certain of the operations of the actuating mechanism. This arrangement helps to avoid overcontrolling with the handle member and accidentally disengaging the main clutch 15 at a time when only the secondary clutch 38 is intended for disengagement.

*Operation*

In order to further review and consider the details of the operations of the instant clutching control or actuating mechanism let us assume initially, that the vehicle into which the mechanism has been incorporated is at rest or stopped whereupon the various components thereof will be relatively positioned as represented in FIG. 2. Since the vehicle is not in motion drive from the engine crank-shaft 13 to the ground-engaging means of the vehicle (not shown) will have been interrupted and one way of accomplishing this is by disengagement of the clutches 15 and 38. When these clutches are both disengaged the operating handle member 52 will have been moved to its rearwardmost position (as seen in FIG. 2), while the pawl 66 attached thereto will be riding in an engaging position against the arcuate surface 75 of the raised ledge member 69, and the push-rod 77 will have been moved as far rearwardly as physically possible, whereas attendant the movement that accomplished this disposition the cam-plate 80 will have rotatively moved the bell-crank device 107 sufficiently to disengage the main clutch 15 while the bell-crank device 115 will have been rotated sufficiently to cause disengagement of the secondary clutch 38.

Assume next it is desired to condition the vehicle for drive through the main clutch 15 and through the torque amplifying unit, indicated at 12, so as to utilize the torque amplifying feature thereof. To accomplish this drive condition the handle member 52 is rotated counterclockwise, or to the left as viewed in FIG. 2, until the pawl member 66 engages the depending vertical ratchet surface 71 of the ridge member 69. This movement of the handle forces the push-rod 77 also to the left, or forwardly as viewed in FIG. 2, and thereupon causes the attached cam-plate 80 to rotate about the pivotal connection at 81 following which the lower branch cam track 100, being in contact with the roller follower 97 piloted on the rock-shaft 93, guides the cam-plate 80 downwardly to the position shown in FIG. 3. As the cam-plate 80 rotates counterclockwise about the pivot at 81 the floating link 88, being pivotally attached at 89 to said cam-plate, follows the movement thereof and in so doing carries with it the crank-arm 92, constituting a portion of the bell-crank 107, which latter then rotates clockwise about the axis of the transverse rock-shaft 93. This clockwise rotation of this bell-crank device causes the shifter-fork element 95 thereof to engage and axially move the throwout bearing unit 27 to the left, or forwardly as viewed in FIG. 2, thereby forcing rotation of the fulcrum elements 30 about their pivots. As these fulcrum elements rotate the projecting or offset arms 34 thereon engagingly contact the back-up plate 17 in fulcruming fashion so as to cause axial movement of the pivotal connections at 29 which results in axial movement of the attached pressure plate 23 and attendant therewith engagement of the main clutch 15. The cam-plate's cam track and the pawl and engaging ratchet surface are so proportioned and disposed that when the handle member is in the rotatably engaged position indicated in FIG. 3, the throwout unit 27 will have moved its pivot 29 past the vertical alignment of pivot 31 thereby effecting the over-centering action which will maintain the clutch 15 engaged or locked until relieved by release or movement of the throwout unit rearwardly beyond its over-centering aligning point. In this condition the secondary clutch 38 is still disengaged and thus drive is carried through the desired elements of the torque amplifying unit 12, as previously mentioned, to effect the required speed change and torque amplification at the ground-engaging means of the vehicle.

Assume next that it is desired to condition the vehicle for direct drive, or what is frequently termed normal operation, in which case the torque amplifying unit is not conditioned for amplifying torque transmitted to the ground-engaging means. To accomplish this direct drive condition the thumb-press button 60 on handle member 52 is pressed downwardly to release pawl lever 66 from its engagement with the vertical ratchet surface 71 thereby permitting further counterclockwise rotation of the handle about the pivot 54. After the handle has moved a predetermined distance the surface 74 of the pawl 66 then engages the horizontal ratchet surface 73 of the ridge member 69 and thus indexes the limit for rotational movement thereof. Attendant this additional movement of the handle 52 the cam-plate 80 is rotated counterclockwise but the center of rotation thereof is now changing and, as a result, said cam-plate is forced in another direction by the shape of the cam track therein so that after the corner, i.e. where the upper and lower branches of the track join, has passed the roller 97 the upper track 99 thereof then controls the movement of said cam-plate. Now, since the contour of this upper branch of the cam track is such that two combined moving effects are simultaneously made, the resultant effect will be that the pivotal connection of the floating link 88 with the cam-plate 80 at 89 will rotate around said link's pivotal connection with the crank-arm 92 at 90 so that no movement of the main clutch bell-crank device 107 will occur, and the pivotal connection of said cam-plate at 81 with the crank-plate 82 will be forced to revolve clockwise around the axis through the transverse rock-shaft 84 and in so doing carry with it the bell-crank device 115. With this clockwise movement of the bell-crank device 115 the shifter-fork portion 87 thereof axially moves the throwout bearing unit 49 forwardly away from the associated clutch fingers 50 thereby allowing the reactive effect of the springs 45 to become effective for forcing the pressure plate 44 and friction disk 46 into engagement with the clutch body member 42 to effect engagement of the secondary clutch 38 without having disturbed the previously engaged relationship of the main clutch 15. When this occurs the various components of the mechanism will assume the relative positions indicated in FIG. 4. The spring 118 in the meantime helps to provide proper clearance in clutch 38 and thus keeps the throwout unit 49 from riding the clutch fingers 50 thereof while also urging the pawl 66 of the handle 52 into engagement with the horizontal ratchet surface 73.

It will be appreciated that clockwise rotation of the handle member 52 will operate to produce the foregoing operational sequence in the reverse order.

While only one form of the invention has been shown, it will be obvious to those skilled in the art that it is not so limited, but is susceptible of various changes and modifications without departing from the spirit thereof, and it is desired, therefore, that only such limitations shall be placed thereon as are specifically set forth in the appended claims.

What is claimed is:

1. In a drive transmitting mechanism having a first clutch with means normally biasing said clutch to a disengaged position and having additional over-centering means associated therewith operative for locking said clutch in an engaged position and a second clutch operatively interconnected to said first clutch and having means associated therewith for normally biasing said second clutch to an engaged position, a plural clutch actuating means, comprising: a separate throwout mechanism for each clutch and being cooperative therewith to effect the selective engagement and disengagement of the respective clutches; a first bell-crank means engageable with the throwout mechanism of said first clutch to effect the actuation thereof; a second bell-crank means engageable with the throwout mechanism of said second clutch to effect the actuation thereof; a fixed support; linkage means including a plate pivotally connected to said second bell-crank means and having a cam track fashioned therein cooperable with the fixed support for guiding movements of said plate, and a floating link member pivotally connected at opposite ends thereof respectively to said plate and to said first bell-crank means; and handle operating means connected to said linkage means and operatively responsive to a manually applied force for sequentially moving said linkage means to a first position wherein both of said clutches are disengaged, and to a second position where the first clutch is engaged while the second clutch is disengaged, and to a third position where both the clutches are engaged.

2. In a drive transmitting mechanism having a first clutch with means normally biasing said clutch to a disengaged position and having additional over-centering means associated therewith operative for locking said clutch in an engaged position and a second clutch operatively interconnected to said first clutch and having means associated therewith for normally biasing said second clutch to an engaged position, a plural clutch actuating means, comprising: a separate throwout mechanism for each clutch and being cooperative therewith to effect the selective engagement and disengagement of the respective clutches; a first bell-crank means engageable with the throwout mechanism of said first clutch to effect the actuation thereof; a second bell-crank means engageable with the throwout mechanism of said second clutch to effect the actuation thereof; a fixed support containing the axis of rotation of one of said bell-crank means; a cam-plate pivotally connected to said second bell-crank means and having a cam track formed in said plate that is cooperative with said fixed support for guiding movements of the plate; a floating link pivotally connected at one end thereof to said cam-plate; lost-motion connecting means connecting the opposite end of said floating link to said first bell-crank whereby when said first clutch is in an engaged position said floating link member may move a predetermined longitudinal distance relative to said bell-crank before imparting any rotative movement to the connected bell-crank device; and handle operating means connected to said cam-plate and being operatively responsive to a manually applied force for sequentially moving said cam-plate to a first position for effecting disengagement of both of said clutches, and to a second position for effecting engagement of said first clutch and disengagement of said second clutch, and to a third position for effecting engagement of both of said clutches.

3. In a drive transmitting mechanism having a first clutch with means normally biasing said clutch to a disengaged position and having additional overcentering means associated therewith operative for locking said clutch in an engaged position and a second clutch operatively interconnected to said first clutch and having means associated therewith for normally biasing said second clutch to an engaged position, a plural clutch actuating means, comprising: a separate throwout mechanism for each clutch and being cooperative therewith to effect the selective engagement and disengagement of the respective clutches; a first bell-crank means engageable upon rotation thereof with the throwout mechanism of said first clutch to effect actuation of that clutch; a second bell-crank means engageable upon rotation thereof with the throwout mechanism of said second clutch to effect actuation of the clutch; a support fixedly positioned with respect to and containing one of the axes of rotation of said bell-crank means; a cam-plate pivotally connected to said second bell-crank means and having a cam track provided in said plate that cooperates with said fixed support for guiding movements of the plate; a floating link pivotally connected at one end thereof to said cam-plate at a point on said plate intermediate said cam track and the pivotal connection of said plate with said second bell-crank, and having a connecting pin fixedly positioned in said link proximate the opposite end thereof; said first bell-crank means being provided with a slotted opening adapted to receive said connecting pin for longitudinal movement along said slotted opening whereby when said first clutch is in an engaged position said floating link may move a predetermined longitudinal distance relative to said first bell-crank before imparting any rotative movement to the first bell-crank device; and handle operating means connected to said cam-plate and being operatively responsive to a manually applied force for sequentially moving said cam-plate to a first position for effecting disengagement of both of said clutches; and to a second position for effecting engagement of said first clutch and disengagement of said second clutch, and to a third position for effecting engagement of both of said clutches.

4. In a drive transmitting mechanism having a first clutch with means normally biasing said clutch to a disengaged position and having additional over-centering means associated therewith operative for locking said clutch in an engaged position and a second clutch operatively interconnected to said first clutch and having means associated therewith for normally biasing said second clutch to an engaged position, a plural clutch actuating means, comprising: a separate throwout mechanism for each clutch and being cooperative therewith to effect the selective engagement and disengagement of the respective clutches; a first bell-crank means having angularly spaced arms and including means for adjusting the angularity displacement therebetween and being engageable with the throughout mechanism of said first clutch to effect the actuation thereof; a second bell-crank means having angularly spaced arms and including means for adjusting the angularity displacement therebetween and being engageable with the throwout mechanism of said second clutch to effect the actuation thereof; a fixed support containing the axis of rotation of said first bellcrank means; resilient means interconnecting said first and second bell-crank means and reactively disposed for urging one of said bellcrank means toward the other; a cam-plate pivotally connected to said second bell-crank means and having a slotted opening therein forming a cam surface; a cam follower rotatably mounted on the fixed support containing the axis of rotation of said first bell-crank means and disposed for positioning within said slotted opening and adapted to cooperate therewith for guiding movements of said cam-plate; a floating link member pivotally interconnecting said cam-plate with said first bell-crank means; and handle operating means connected to said cam-plate and operatively responsive to a manually applied force for moving said cam-plate to any one of a plurality of predetermined positions for selectively effecting the engagement and disengagement of said clutches.

5. In a drive transmitting mechanism of the class described: a housing; a plural clutching assembly including a first clutch having means normally biasing said clutch to a disengaged position and having additional overcentering means associated therewith operative for locking said clutch in an engaged position, a second clutch having means associated therewith normally biasing said latter clutch to an engaged position, a separate throwout bearing mechanism for each clutch and adapted for cooperation therewith to effect the actuation of a respective clutch, and having said clutches disposed in said housing in a coaxially arranged relationship and spaced from one another and operatively interconnected whereby drive for said second clutch is received from said first clutch; clutch actuating means connected to each of said throwout mechanisms and operative responsive to a manually applied force for selectively effecting the engagement and disengagement of said clutches; said actuating means including a separate bell-crank assembly for each clutch which is rotatably mounted on said housing and engageable with a respective throwout mechanism, a fixed support containing the axis of rotation of one of said bellcrank means, resilient means interconnecting said bell-crank assemblies and reactively disposed for urging rotation of said bell-crank assemblies in opposite directions, a plate-like member pivotally connected to one of said bell-crank assemblies and adapted for rotation therewith, a floating link member having the opposite ends thereof pivotally connected to said plate member and another of said bell-crank assemblies, means forming a cam surface in said plate member, cam engaging means rotatably mounted on the fixed support containing the axis of rotation of said one of said bell-crank assemblies and engageable with the cam surface of said plate member for controlling the movements of said plate member, and an operating means connected to said plate member and being operatively responsive to a manually applied force for moving said cam-plate to any one of a plurality of positions for selectively effecting the engagement and disengagement of said clutches.

6. In a drive transmitting mechanism of the class described: a housing; a plural clutching assembly including a first clutch having means normally biasing said clutch to a disengaged position and having additional overcentering means associated therewith operative for locking said clutch in an engaged position, a second clutch having means associated therewith normally biasing said latter clutch to an engaged position, a separate throwout bearing mechanism for each clutch and adapted for cooperation therewith to effect the actuation of a respective clutch, and having said clutches disposed in said housing in a coaxially arranged relationship and spaced from one another and operatively interconnected whereby drive for said second clutch is received from said first clutch; clutch actuating means connected to each of said throwout mechanisms and operative responsive to a manually applied force for selectively effecting the engagement and disengagement of said clutches; said actuating means including a separate bell-crank assembly for each clutch which is rotatably mounted on said housing and engageable with a respective throwout mechanism, resilient means interconnecting said bell-crank assemblies and reactively disposed for urging rotation of said bell-crank assemblies in opposite directions, a plate-like member pivotally connected to one of said bell-crank assemblies and adapted for rotation therewith, a floating link pivotally connected at one end thereof to said plate member, lost-motion connecting means connecting the opposite end of said floating link to another of said bell-crank assemblies whereby when said first clutch is in an engaged position said connected floating link may move a predetermined longitudinal distance before imparting any rotative movement to said connected bell-crank assembly, means forming a cam surface in said plate member, cam-engaging means rotatably mounted on the housing mounting containing the axis of rotation of the bell-crank assembly associated with said first clutch and engageable with said cam surface for guiding movements of said plate member, and an operating means connected to said plate member and being operatively responsive to a manually applied force for moving said cam-plate to any one of a plurality of positions for selectively effecting engagement and disengagement of said clutches.

References Cited in the file of this patent

UNITED STATES PATENTS

| | | |
|---|---|---|
| 403,546 | McMahon | May 21, 1889 |
| 1,723,887 | Pfaff | Aug. 6, 1929 |
| 2,049,144 | Wahlberg | July 28, 1936 |
| 2,899,034 | Hubert | Aug. 11, 1959 |

FOREIGN PATENTS

| | | |
|---|---|---|
| 616,892 | Great Britain | Jan. 28, 1949 |